US009204037B2

(12) United States Patent
Na et al.

(10) Patent No.: US 9,204,037 B2
(45) Date of Patent: Dec. 1, 2015

(54) METHOD AND APPARATUS FOR PHOTOGRAPHING IN PORTABLE TERMINAL

(71) Applicant: Samsung Electronics Co. Ltd., Suwon-si, Gyeonggi-do (KR)

(72) Inventors: Jinhee Na, Seoul (KR); Kihuk Lee, Suwon-si (KR); Minchul Kim, Busan (KR); Youngkwon Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 14/036,590

(22) Filed: Sep. 25, 2013

(65) Prior Publication Data

US 2014/0085499 A1  Mar. 27, 2014

(30) Foreign Application Priority Data

Sep. 25, 2012 (KR) ........................ 10-2012-0106798

(51) Int. Cl.
*H04N 5/232* (2006.01)
*H04N 1/21* (2006.01)

(52) U.S. Cl.
CPC ........... *H04N 5/23219* (2013.01); *H04N 1/215* (2013.01); *H04N 5/23293* (2013.01)

(58) Field of Classification Search
CPC ............ H04N 5/23219; H04N 5/2356; H04N 5/23222; H04N 1/624; H04N 1/6086; G06K 9/00221
See application file for complete search history.

(56) References Cited

U.S. PATENT DOCUMENTS

| 7,555,148 | B1* | 6/2009 | Steinberg et al. ............. 382/118 |
| 8,139,817 | B2* | 3/2012 | Laganiere et al. ............ 382/103 |
| 8,441,548 | B1* | 5/2013 | Nechyba et al. ........... 348/222.1 |
| 2002/0051072 | A1 | 5/2002 | Sumitomo et al. |
| 2007/0182823 | A1 | 8/2007 | Maruyama et al. |
| 2008/0267458 | A1* | 10/2008 | Laganiere et al. ............ 382/118 |
| 2009/0087099 | A1 | 4/2009 | Nakamura |
| 2009/0204894 | A1 | 8/2009 | Bhatt et al. |
| 2009/0207279 | A1* | 8/2009 | Ochi et al. ............... 348/231.99 |
| 2009/0324098 | A1 | 12/2009 | Nilsson |
| 2010/0026843 | A1 | 2/2010 | Tezuka et al. |
| 2010/0045821 | A1 | 2/2010 | Mergler |
| 2010/0194963 | A1 | 8/2010 | Terashima |
| 2010/0303342 | A1 | 12/2010 | Berg et al. |

(Continued)

FOREIGN PATENT DOCUMENTS

| EP | 2 129 111 A1 | 12/2009 |
| JP | 2006-261915 A | 9/2006 |
| KR | 10-2008-0109519 A | 12/2008 |

(Continued)

*Primary Examiner* — Nicholas Giles
(74) *Attorney, Agent, or Firm* — Jefferson IP Law, LLP (57) ABSTRACT

An image photographing method and an apparatus in a portable terminal is provided. The method includes photographing an image a number of times with an interval when a photographing signal is input in an optimum subject photographing mode, recognizing a subject from the photographed images, extracting a candidate image which includes the recognized subject, determining a validity of the extracted candidate image, displaying one of the photographed images as a representative image, and dividing and displaying a valid candidate image which is determined as a valid candidate image and an invalid candidate image which is determined as an invalid candidate image on one side of the displayed representative image, or displaying only the valid candidate image.

17 Claims, 6 Drawing Sheets

(56) References Cited

U.S. PATENT DOCUMENTS

| | | | |
|---|---|---|---|
| 2011/0261219 A1* | 10/2011 | Suzuki et al. | 348/222.1 |
| 2012/0082389 A1* | 4/2012 | Sakamoto | 382/224 |
| 2012/0293642 A1* | 11/2012 | Berini et al. | 348/77 |
| 2013/0336527 A1* | 12/2013 | Nechyba et al. | 382/103 |
| 2014/0376879 A1* | 12/2014 | Yoshida | 386/230 |

FOREIGN PATENT DOCUMENTS

| | | |
|---|---|---|
| KR | 10-2011-0083025 A | 7/2011 |
| WO | 2009/156785 A1 | 12/2009 |

* cited by examiner

FIG. 5

METHOD AND APPARATUS FOR PHOTOGRAPHING IN PORTABLE TERMINAL

CROSS-REFERENCE TO RELATED APPLICATION(S)

This application claims the benefit under 35 U.S.C. §119 (a) of a Korean patent application filed on Sep. 25, 2012 in the Korean Intellectual Property Office and assigned Serial No. 10-2012-0106798, the entire disclosure of which is hereby incorporated by reference.

TECHNICAL FIELD

The present disclosure relates to a method and an apparatus for an image photographing. More particularly, the present disclosure relates to a method and an apparatus for an image photographing in a portable terminal

BACKGROUND

A portable terminal has become a necessity of modern people based on its mobility, and provides a variety of functions which are needed by the users. For example, the portable terminal provides various functions such as a call function, an image or a video photographing function, a broadcasting reception function, and an interne access function. However, the image photographing function has a problem in that it is difficult to photograph a user's desired moment exactly. For example, the image photographing function of the portable terminal has problems such as an eye closed image, an out of focus image due to wobbling of the portable terminal, and other unintended images taken with a subject.

Thus, in the related art, a photographing method for providing a high-quality composite image has been proposed by photographing a subject multiple times sequentially, and compositing a plurality of photographing images appropriately. In addition, the proposed photographing method displays the candidate image which extracts some areas including a subject from the photographed images, and provides a composite image by using the candidate image selected by a user among the displayed candidate images.

On the other hand, when a camera wobbles during a plurality of times of photographing or when a subject moves, the extracted candidate images include a candidate image which is appropriate for compositeness and a candidate image which is inappropriate for compositeness. Here, a portable terminal of the related art displays the candidate image which is appropriate for compositeness and the candidate image which is inappropriate for compositeness together without any distinction. As a result, when a user selects an inappropriate image, an inappropriate composite image may be generated. Likewise, when the inappropriate composite image is generated, it causes an inconvenience to the user to newly generate an appropriate composite image by selecting other candidate images after verifying that the composite image is inappropriate.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image photographing method and an apparatus in a portable terminal that determines a validity of the candidate images extracted from a plurality of photographing images, and notifies a determination result to a user.

The present disclosure further provides an image photographing method and an apparatus in a portable terminal that allows a user to only select an appropriate candidate image among the candidate images.

In accordance with an aspect of the present disclosure, a method of image photographing in a portable terminal is provided. The method includes photographing an image a number of times with an interval when a photographing signal is input in an optimum subject photographing mode, recognizing a subject from the photographed images, extracting a candidate image which includes the recognized subject, determining a validity of the extracted candidate image, displaying one of the photographed images as a representative image, and dividing and displaying a valid candidate image which is determined as a valid candidate image and an invalid candidate image which is determined as an invalid candidate image on one side of the displayed representative image, or displaying only the valid candidate image.

In accordance with another aspect of the present disclosure, an apparatus for image photographing in a portable terminal is provided. The apparatus includes a camera unit configured to photograph an image a number of times with an interval when a photographing signal is input in an optimum subject photographing mode, a controller configured to recognize a subject from the photographed images, to extract a candidate image which includes the recognized subject, and to determine a validity of the extracted candidate image, and a touch screen configured to display a representative image as an entire screen, to divide and display a valid candidate image which is determined as a valid candidate image and an invalid candidate image which is determined as an invalid candidate image on one side of a display screen of the representative image, or to display only the valid candidate image, under the control of the controller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "portable terminal" refers to a terminal providing a photographing function, and may be a mobile communication terminal, a personal information terminal, a smart phone, a tablet Personnel Computer (PC), a Portable Multimedia Player (PMP), and the like.

Figure 1:
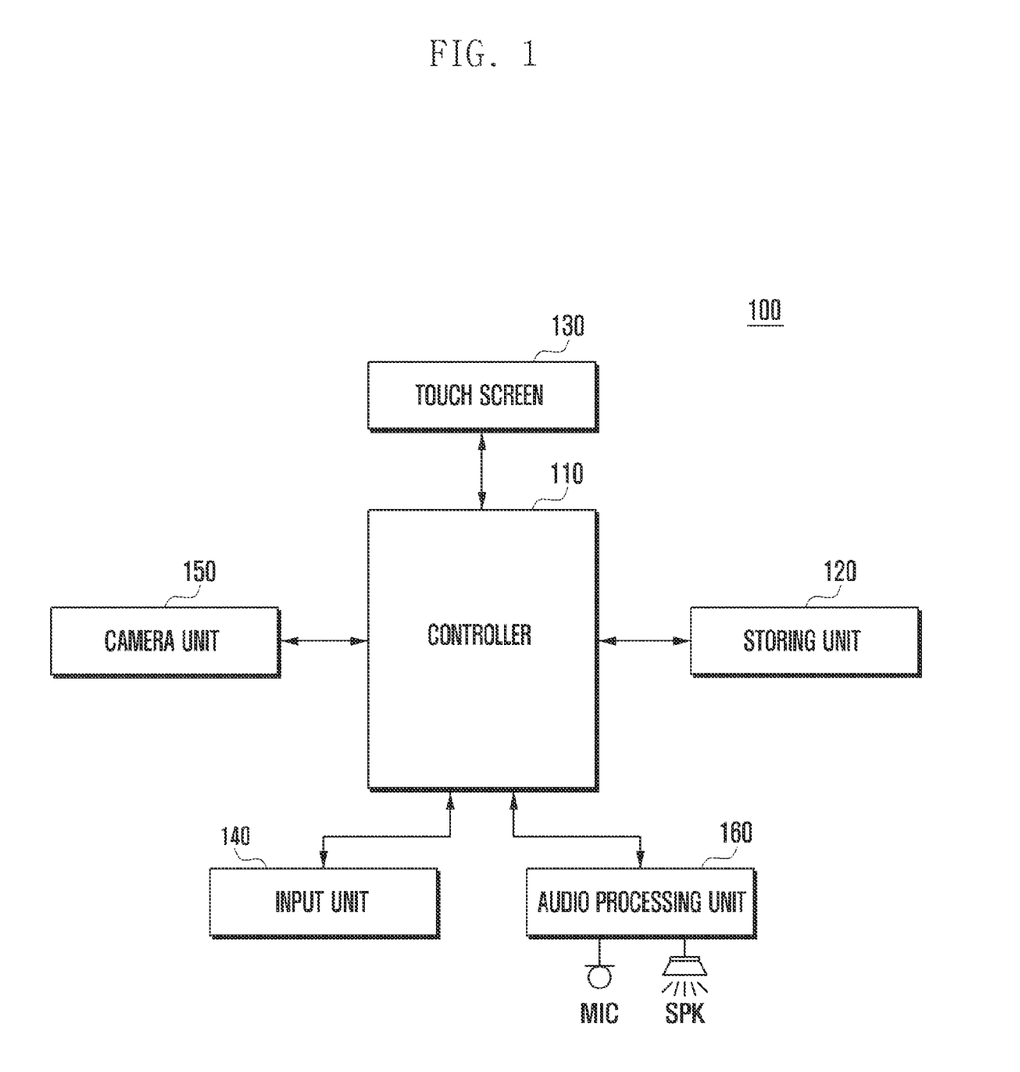
FIG. 1 is a block diagram schematically illustrating a configuration of a portable terminal according to an embodiment of the present disclosure.

FIG. 1 is a block diagram schematically illustrating a configuration of a portable terminal according to an embodiment of the present disclosure.

Referring to FIG. 1, a portable terminal 100 may include an audio processing unit 160, a camera unit 150, an input unit 140, a touch screen 130, a storing unit 120 and a controller 110.

The portable terminal 100 having such configuration may support an operation of an optimum subject photographing mode. In more detail, the portable terminal 100 may photograph an image as many times as a certain number (e.g., 5 times) with an interval of a certain period of time (e.g., 0.5 second) when an optimum subject photographing is requested. In that case, the portable terminal 100 recognizes the subject (e.g., a face) from the photographed images, and extracts some areas which include the recognized subject as a candidate image. Also, the portable terminal 100 determines a validity of the extracted candidate image. When the determination of the validity is completed, the portable terminal 100 displays one of the photographed images as a representative image, and may display to be divided into a valid candidate image which has been determined as a valid candidate image and an invalid candidate image which has been determined as an invalid candidate image on one side of the displayed representative image. In addition, the portable terminal 100 may display only a valid candidate image on one side of the representative image.

The audio processing unit 160 includes a speaker (SPK) for outputting audio data which is transmitted and received during a call, audio data which is included in a received message, and audio data according to an audio file play which is stored in the storing unit 120. The audio processing unit 160 also includes a microphone (MIC) for collecting a user's voice during a call, or other audio signals. In particular, the audio processing unit 160 may output a sound effect (e.g., consecutive photographing sound) according to an optimum subject photographing through the speaker. Alternatively, when a user selects an invalid candidate image, the audio processing unit 160 may output a sound effect through the speaker to notify of the invalid candidate image selection to the user.

The camera unit 150 is an apparatus for photographing a subject, and may store a subject photographed image after converting an electrical signal into digital data. The camera unit 150 may be implemented as a Charge Coupled Device (CCD) image sensor, or a Complementary Metal Oxide Semiconductor (CMOS) image sensor. The camera unit 150 may support a picture photographing function and a video photographing function. In particular, the camera 150 may support an optimum subject photographing mode. The optimum subject photographing mode is a mode for photographing a subject as many times as the certain number (e.g., 5 times) with a certain time interval (e.g., 0.5 second). Here, the photographing time interval and the photographing number of the optimum subject photographing mode may be set variously according to a user or a designer's intent.

The input unit 140 may include a plurality of input keys and function keys to receive a number or character information and set the various functions. The function keys may include an arrow key, a side key, and a shortcut key which are set to perform a specific function. In addition, the input unit 140 generates a key signal related to a user's setting and a function control of the portable terminal 100, and delivers to the controller 110. Such input unit 140 may be formed as any one of the input means such as a QWERTY keypad, a 3*4 keypad, a 4*3 keypad, a Ball Joystick, an Optical Joystick, a Wheel Key, a Touch Key, a Touch Pad, and a Touch-screen, or may be a combination thereof. On the other hand, the input unit 140 may only include a volume key which is formed on a side of the portable terminal 100 and a function key for a screen on/off, or a power on/off when the portable terminal 100 supports a full touch screen. In particular, the input unit 140 may deliver various signals such as a signal turning the optimum subject photographing mode on/off, a photographing signal requesting a photographing, a signal selecting a subject to be changed, a signal selecting a candidate image, a storing signal requesting a storing to the controller 110, and the like.

The touch screen 130 may provide an output function and an input function. To this end, the touch screen 130 may include a display panel (not shown) and a touch panel (not shown). Since a configuration of such touch screen 130 is well known to those who are skilled in the present art, a detailed description thereof will be omitted. In particular, the touch screen 130 may receive various touch signals such as a signal turning an optimum subject photographing mode on/off, a photographing signal requesting a photographing, a selection signal selecting a subject to be changed, a selection signal selecting a candidate image, a storing signal requesting a storing, and the like, and transmit the signal to the controller 110.

On the other hand, the touch screen 130 may display various screens such as a preview screen for an optimum subject photographing, a screen displaying a representative image among the photographed images, a screen to be divided into a valid candidate image which has been determined as a valid candidate image and an invalid candidate image which has been determined as an invalid candidate image on one side of the representative image, a screen displaying only a valid candidate image on one side of the representative image, and a screen displaying an image after replacing a subject display area of the representative image into a candidate image which has been selected among the valid candidate images. A description of the various screens will be provided later with reference to FIGS. 3 to 5.

The storing unit 120 may store an Operating System (OS) of the portable terminal 100 as well as an application program which is necessary for other functions, for example, a sound play function, an image or a video play function, a broadcasting play function, and the like. The storing unit 120 may also store data such as a user's data and data transmitted and received during a communication. In particular, the storing unit 120 may store a photographed image through the optimum subject photographing mode. To this end, the storing unit 120 may store an image processing program. The image processing program may include a routine for recognizing a subject from the representative image through a subject recognition function (for example, a face recognition function), a routine for extracting a candidate image by cutting some areas which includes the subject, a routine for determining the validity of the candidate image according to various reference conditions, and a routine for compositing a candidate image which is selected by a user with a representative image. The reference condition for the validity determination may include a Histogram, a size and a position of a candidate image, a blur detection using a contrast or an edge, a feature vector, and the like. A description of the validity determination of the candidate images through the reference condition will be described later.

The controller 110 controls an overall operation of the portable terminal 100 and a signal flow between the internal blocks of the portable terminal 100, and may perform a data processing function that processes the data. In implementation, the controller 110 may be a Central Processing Unit (CPU), an Application Processor, and the like. In particular, the controller 110 may control an operation of the optimum subject photographing mode. The detailed description of the optimum subject photographing procedure control of the controller 110 will be described later with reference to FIGS. 2A to 5. Such controller 110 may include an Image Signal Processor (ISP, not shown) which appropriately processes the image photographed through the camera unit 150. However, the present disclosure is not limited hereto. In other words, the Image Signal Processor (ISP) may be included in the camera unit 150, or be included in a separate configuration.

On the other hand, although not illustrated in FIG. 1, the portable terminal 100 may further selectively include elements which have an additional function such as a broadcasting receiving module for a broadcasting reception, a mobile communication module for a mobile communication function, a digital music player module such as an MP3 player, a motion sensor module for detecting a movement of the portable terminal 100, and the like. Such elements are diverse according to a convergence trend of digital devices, and it is difficult to describe them all. However, it is to be understood that the portable terminal 100 may further include the elements equivalent to the above described elements.

Figure 2A:
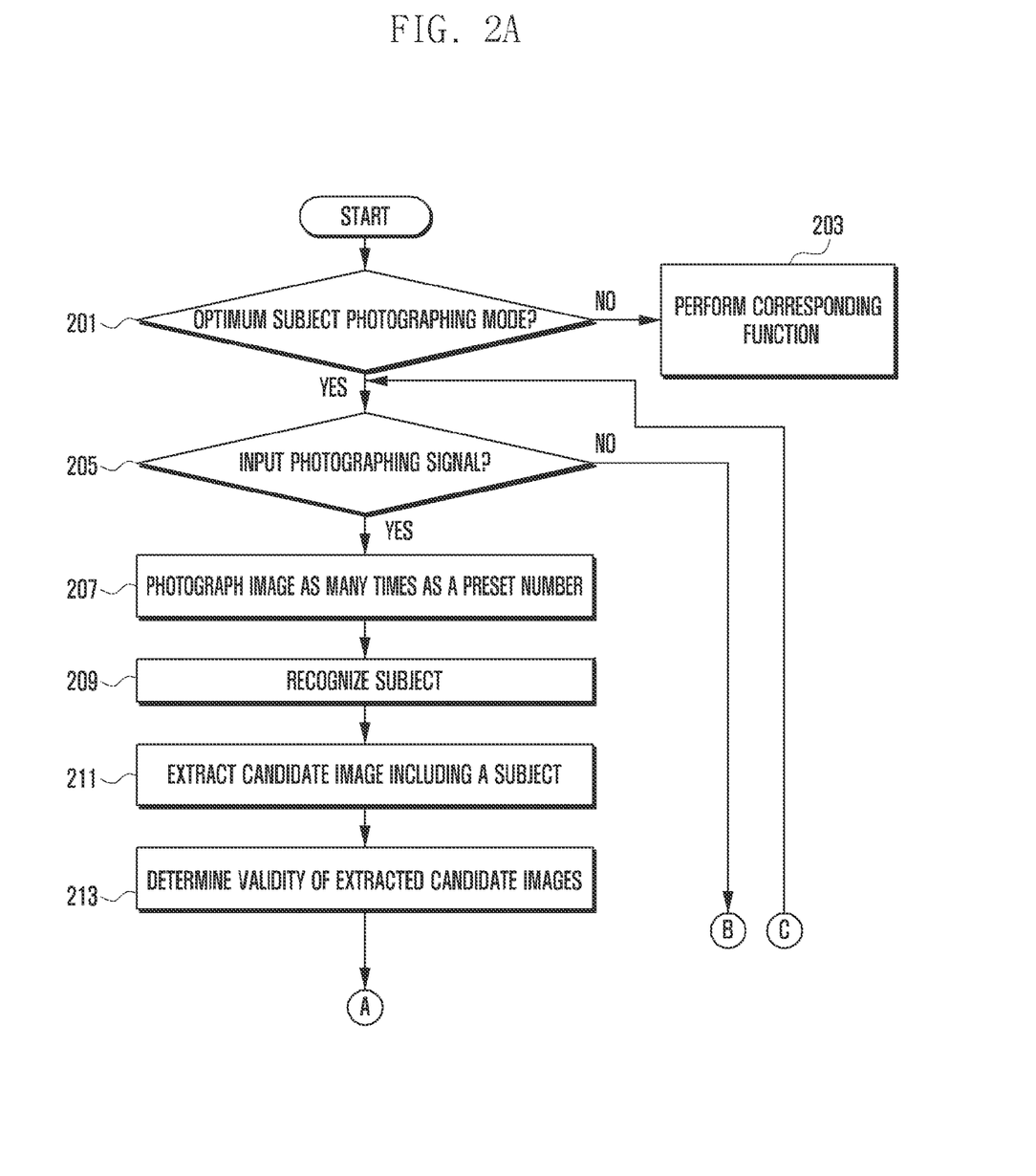
FIGS. 2A and 2B are flowcharts explaining an image photographing method of a portable terminal according to an embodiment of the present disclosure.
Figure 2B:
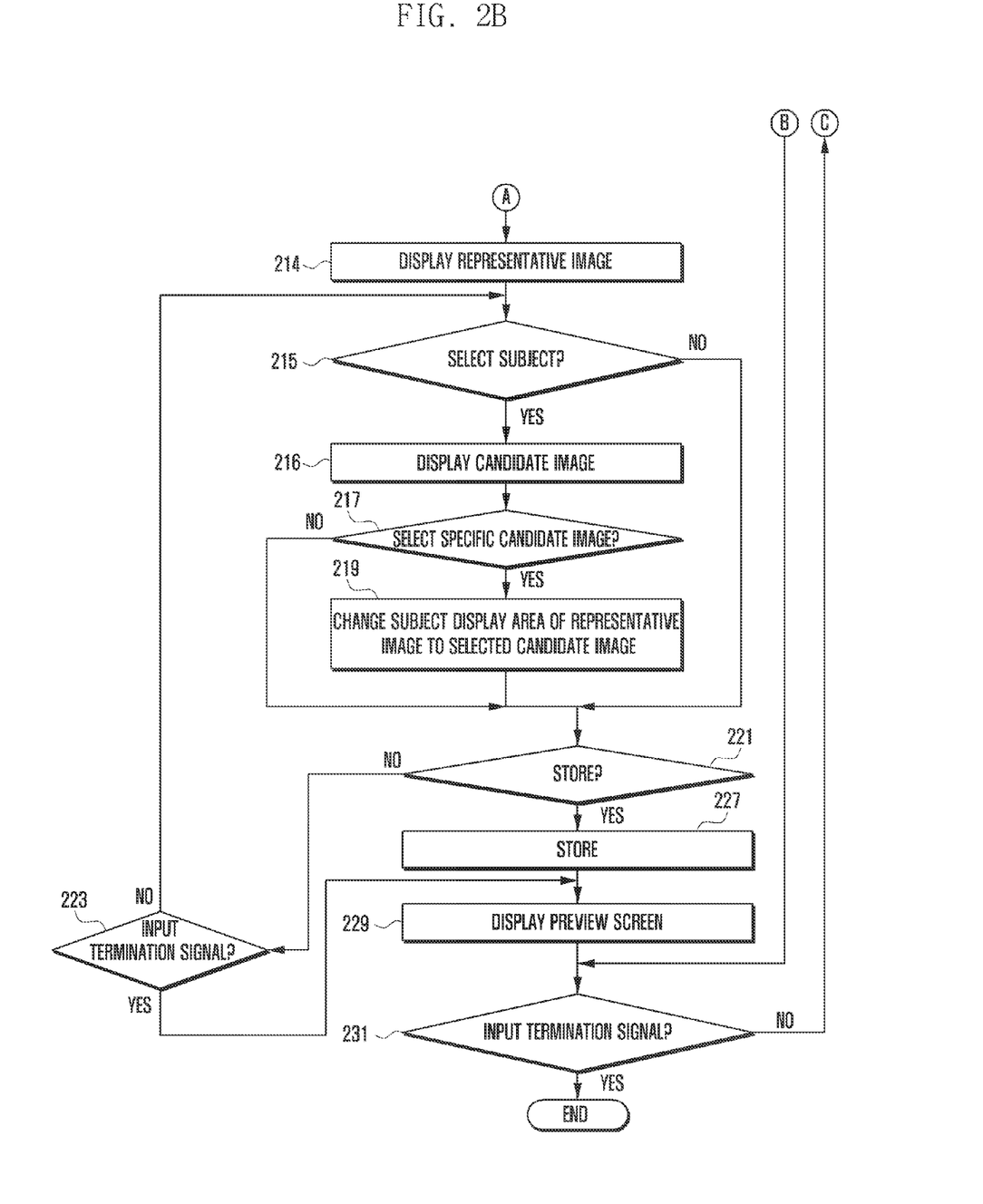
Figure 3:
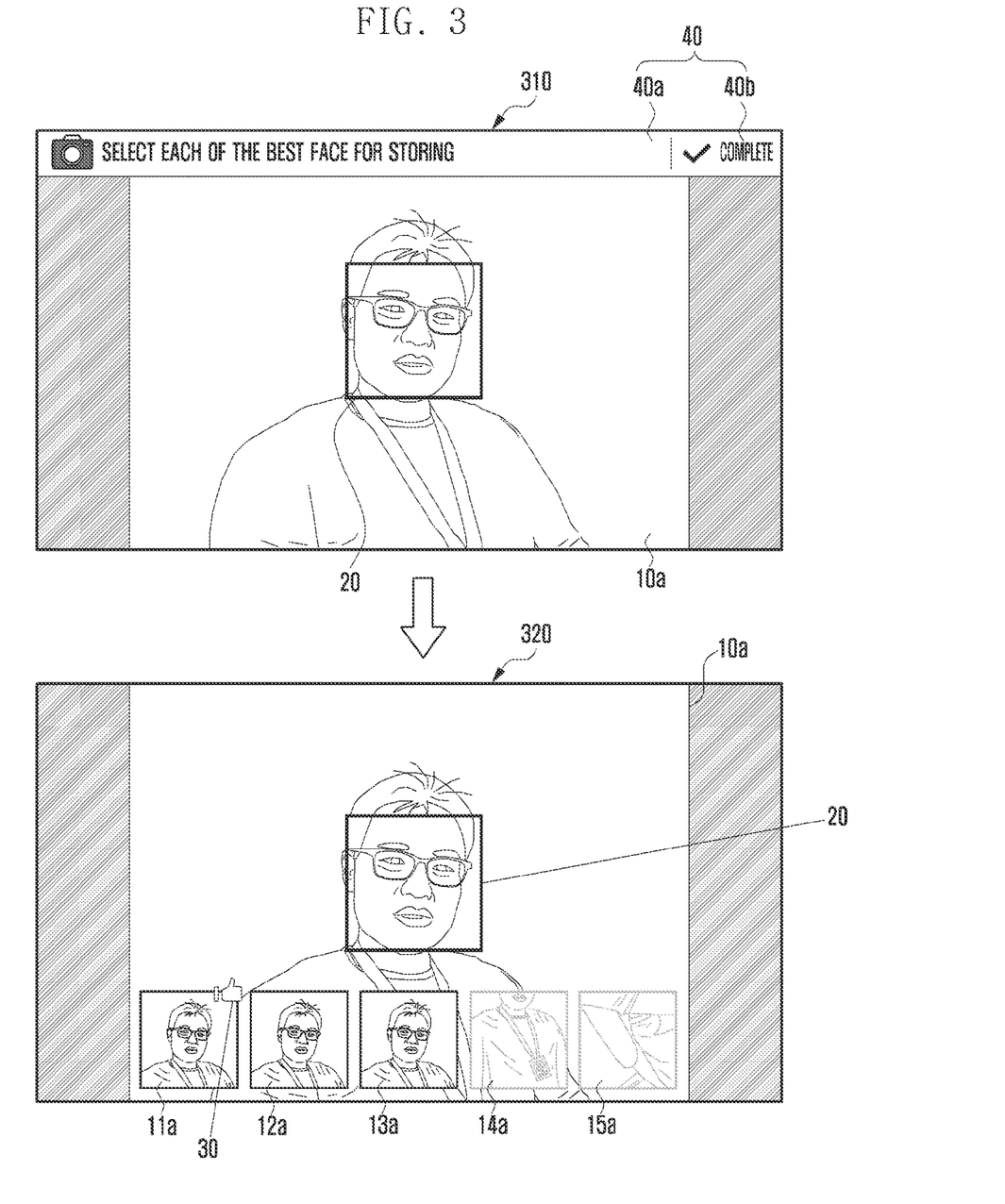
FIGS. 3, 4, and 5 are screen views explaining an image photographing method of a portable terminal according to an embodiment of the present disclosure.
Figure 4:
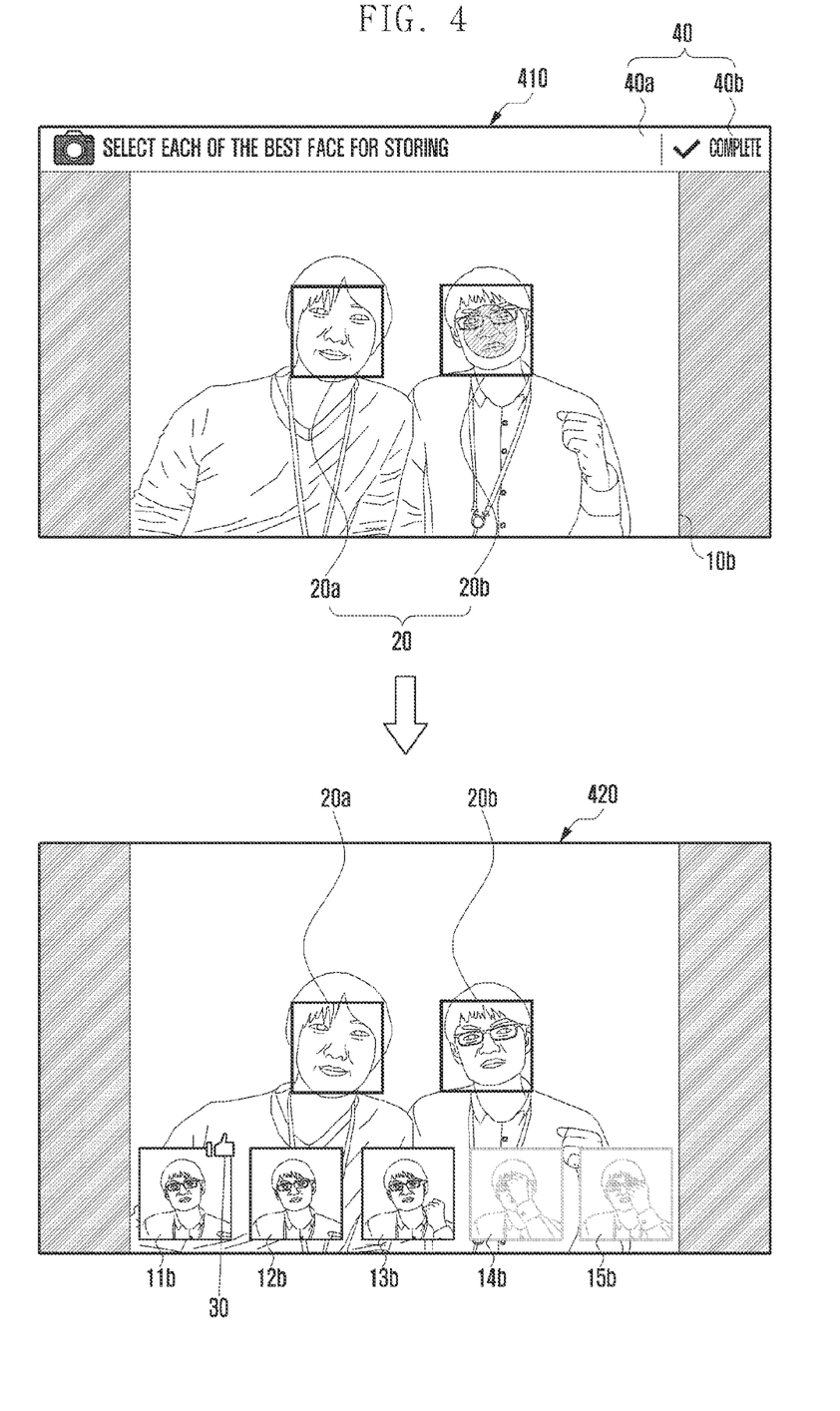
Figure 5:
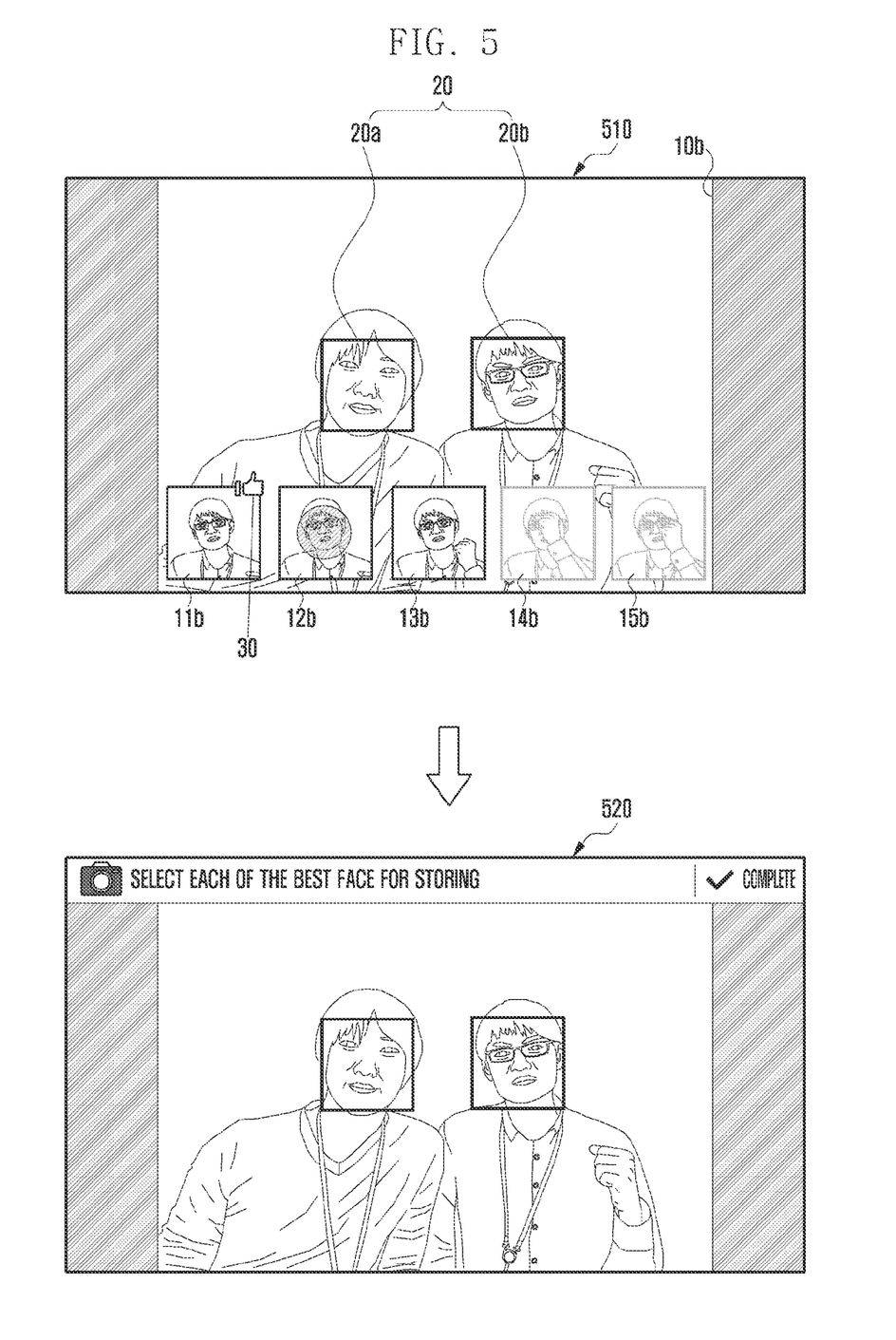

FIGS. 2A and 2B are flowcharts for explaining an image photographing method in a portable terminal according to an embodiment of the present disclosure. FIGS. 3, 4, and 5 are screen views explaining an image photographing method in a portable terminal according to an embodiment of the present disclosure.

Referring to FIGS. 1 to 5, the controller 110 may verify whether the optimum subject photographing mode is activated at operation 201. The optimum subject photographing mode may be activated through a menu in a preview screen, or may be activated through a function key input, or a shortcut icon touch from a home screen/menu screen.

The optimum subject photographing mode is a mode for photographing a subject as many times as the certain number (for example, 5 times) with an interval of a certain period of time (for example, 0.5 second). Here, a photographing time interval and a photographing number of the optimum subject photographing mode may be set variously according to a user or a designer's intent.

When the optimum subject photographing mode is not activated, the controller 110 may perform the corresponding function at operation 203. For example, the controller 110 may perform a general picture photographing function, a video photographing function, a panorama picture photographing function in request of the user, and the like. On the contrary, when the optimum subject photographing mode is activated, the controller 110 may verify whether a photographing signal is input at operation 205. When the photographing signal is not input, the controller 110 may proceed to operation 231 which is to be described later. On the other hand, when the photographing signal is input, the controller 110 may photograph a subject as many times as the certain number with an interval of a certain period of time at operation 207.

The controller 110 recognizes the subject from the photographed images at operation 209, and may extract some areas which include the recognized subject as a candidate image at operation 211. Here, the subject may be a face. However, it is obvious to a person having ordinary skill in the art of the present disclosure that the subject of the present disclosure is not limited to the face. Next, the controller 110 determines a validity of the extracted candidate images at operation 213. The validity may be determined by at least one of the various evaluation references (e.g., a Histogram, a size and a position of a candidate image, a contrast, and a feature vector). In more detail, the controller 110 measures to compare a Histogram of the extracted candidate images, and may determine a candidate image as an invalid candidate image if a difference of the Histogram is greater than a reference value. Here, the controller 110 may compare the Histogram based on the candidate image which is included in the representative image. Alternatively, the controller 110 may compare the Histogram for all comparable number of cases of the candidate images.

The controller 110 may compare the size and the position of the extracted candidate images, and may determine a candidate image as an invalid candidate image when the difference of at least one of the size and the position is greater than a reference value. Here, the controller 110 compares the size and the position based on the candidate image included in the representative image, or may compare the size and the position with respect to all comparable number of cases.

The controller 110 may analyze the extracted candidate images through a blur detector (for example, analyzes a contrast and an edge of the extracted candidate images), and may determine a candidate image as an invalid candidate image when the difference is greater than a reference value by comparing the analysis result. Here, the controller 110 compares the analysis result based on the candidate image included in the representative image, or may compare the analysis result with respect to all comparable number of cases.

The controller 110 may calculate a feature vector of the extracted candidate images, and may determine a candidate image as an invalid candidate image when the difference is greater than a reference value by comparing the extracted feature vector. Here, the controller 110 compares all pixels of a candidate image, or may compare only a part of the pixels. In addition, the controller 110 normalizes the candidate image, and may calculate a feature vector from the normalized candidate image. The controller 110 compares the feature vector based on the candidate image included in the representative image, or may compare the feature vector with respect to all comparable number of cases.

Once the validity determination of the extracted candidate images is completed, the controller 110 may display the representative image at operation 214. The representative image may be a first photographed image. In addition, the representative image may be the photographed image which best matches a reference condition (e.g., a focus, a clearness, etc.) among a plurality of photographed images instead of the first photographed image. Furthermore, the representative image may be a composite image of any one of the candidate images with any one of the photographed images. In other words, the representative image displaying at operation 214 may be the composite image which is selected as the most appropriate one after compositing the photographed images with the extracted candidate images variously by the controller 110.

The controller 110 may verify whether the subject has been selected at operation 215. When the subject has not been selected, the controller 110 may proceed to operation 221 which will be described later. On the other hand, when the subject to be changed is selected from the representative, the controller 110 may output a candidate image on one side of the display screen of the representative image at operation 216. Here, the controller 110 may be displayed to be divided into a valid candidate image which has been determined as a valid candidate image and an invalid candidate image which has been determined as an invalid candidate image according to the determination result at operation 213. For example, the controller 110 displays the valid candidate image as an activated state, and may display the invalid candidate image as an inactivated state. In addition, the controller 110 may differently display the valid candidate image and the invalid candidate image using at least one of a color and a contrast. Furthermore, the controller 110 may display an icon indicating the valid candidate image or the invalid candidate image on one side of each candidate image.

The above process will be described in more detail with reference to FIGS. 3 and 4. First, referring to FIG. 3, once the validity determination of the extracted candidate images is completed, the controller 110 may output the representative image 10*a* among the photographed images as an entire screen as illustrated in the screen view 301. Here, the representative image 10*a* may display, on the top of the screen, a mark 20 of a square type for notifying a selectable subject to a user, and a notification bar 40 including a text 40*a* inducing a selection of the subject to be changed and a storing menu 40*b* to store the representative image 10*a*.

In a state of the screen view 310, when the mark 20 is selected (touched), the controller 110 may arrange and display the candidate images 11*a*, 12*a*, 13*a*, 14*a*, and 15*a* extracted from the photographed images as illustrated in the screen view 320 in one row on the bottom of the screen. However, the present disclosure is not limited to arrange and display candidate images in one row. In other words, in another embodiment of the present disclosure, it is possible to display them in two rows, or to display to be able to scroll.

Meanwhile, the controller 110 may control the touch screen 130 to display by dividing the candidate images into valid candidate images 11*a*, 12*a*, 13*a* and invalid candidate images 14*a*, 15*a*. For example, the controller 110 displays the valid candidate images 11*a*, 12*a*, 13*a* normally, and may display the invalid candidate images 14*a*, 15*a* dimly as illustrated in the screen view 320. However, the present disclosure is not limited to display the invalid candidate images 14*a*, 15*a* dimly. In other words, the present disclosure may display to divide into the valid candidate image and the invalid candidate image through various methods. For example, the controller 110 may control the touch screen 130 to display the valid candidate image as an activated state, and the invalid candidate image as an inactivated state. Also, the controller 110 may control the touch screen 130 to differently display the valid candidate image and the invalid candidate image by at least one of a color and a contrast. In addition, the controller 110 may control the touch screen 130 to display an icon indicating the valid candidate image or the invalid candidate image on one side of each candidate image.

Furthermore, the controller 110 may display a recommendation icon 30 on one side of the candidate image which best matches to the reference condition among the extracted valid candidate images.

When the representative image includes a plurality of subjects, the controller 110 may display a mark 20 on a plurality of subjects respectively as illustrated in the screen view 410 in FIG. 4. For example, the controller 110 may display a first mark 20*a* for notifying of a first subject, and a second mark 20*b* for notifying of a second subject on the representative image 10*b*. Next, when the second subject is selected (e.g., touched), the controller 110 may arrange and display the candidate images 11*b*, 12*b*, 13*b*, 14*b*, 15*b* corresponding to the selected second subject on the bottom of the screen as illustrated in the screen view 420. Meanwhile, the controller 110 may control the touch screen 130 to display to divide the candidate images into the valid candidate images 11*b*, 12*b*, 13*b*, and the invalid candidate images 14*b*, 15*b*. Here, a description of other configurations in FIG. 4 will be omitted since it is identical to FIG. 3.

The controller 110 may verify whether the specific candidate image is selected among the candidate images at operation 217. When the specific candidate image is not selected, the controller 110 may proceed to operation 221 which will be described later. On the other hand, when the specific candidate image is selected, the controller 110 changes the subject display area of the representative as the selected candidate image at operation 219. That is, the controller 110 may composite the representative image with the selected candidate image. For example, when the second candidate image 12*b* is touched in a state such as the screen view 510 in FIG. 5 in which the second subject is selected (e.g., touched), the controller 110 may change the second subject of the representative image 10*b* to the second candidate image 12*b* as illustrated in the screen view 520. Here, the controller 110 deletes the candidate images 11*b* to 15*b* from the screen, and outputs again the notification bar 40 on the top of the screen.

The controller 110 may verify whether the storing signal is input at operation 221. The storing signal may be input through the storing menu 40*b* which is included in the notification bar 40. When the storing signal is not input at operation 221, the controller 110 may verify whether the termination signal has been input (e.g., a cancel key input) at operation 223. When the termination signal is input at operation 223, the controller 110 may proceed to operation 229 which will be described later. On the other hand, when the termination signal is not input at operation 223, the controller 110 may repeat the above described procedure by returning to operation 215.

Meanwhile, when the storing request signal is input at operation 221, the controller 110 stores the representative image at operation 227, and may control the touch screen 130 to display the preview screen at operation 229.

The controller 110 may verify if the termination signal is input (e.g., a cancel key input) at operation 231. When the termination signal is not input at operation 231, the controller 110 may repeat the above described procedure by returning to operation 205. On the other hand, when the termination input is input at operation 231, the controller 110 may terminate the optimum subject photographing mode.

Hereinabove, it was described that the controller 110 automatically recognizes the subject from the photographed images through the subject recognition function. However, the present disclosure is not limited thereto. That is, in another embodiment of the present disclosure, a representative image is displayed among the photographed images, and when at least one of the subjects is selected from the representative images by the user, the candidate images corresponding to at least one subject selected by the user may be extracted from the photographed images.

In addition, hereinabove, it was described that the valid candidate image and the invalid candidate image are divided to be displayed on the representative image. However, the present disclosure is not limited thereto. That is, another embodiment of the present disclosure may display only the valid candidate image, and may control not to display the invalid candidate image.

The present disclosure described above has an effect to improve the convenience of a user by dividing and displaying the valid candidate image and the invalid candidate image among the extracted candidate images. In particular, by displaying not to select an invalid candidate image by the user, the present disclosure may prevent an image composite error. In addition, the present disclosure may improve a user's convenience by notifying of the optimum candidate image to the user according to the determination result.

As described above, an image photographing method and an apparatus in a portable terminal according to an embodiment of the present disclosure determines a validity of the candidate images extracted from a plurality of photographed images, and divides and displays an inappropriate invalid candidate image and an appropriate valid candidate image according to a determination result to improve a user's convenience. In particular, the present disclosure may prevent an image composite error by displaying an invalid candidate image as an inactivated state, or not displaying it so that a user may not select it. In addition, the present disclosure may improve a user's convenience by notifying the optimum candidate image to the user according to the determination result.

It will be appreciated that embodiments of the present disclosure can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of image photographing in a portable terminal, the method comprising:
   photographing at least one image a number of times with an interval;
   recognizing a subject from the at least one photographed image;
   extracting a part of the at least one photographed image as a candidate image which includes the recognized subject;
   determining a validity of the extracted candidate image based on at least one evaluation reference;
   displaying one of the at least one photographed image as a representative image;
   displaying at least one of a valid candidate image which is determined as a valid candidate image and an invalid candidate image which is determined as an invalid candidate image on one side of the displayed representative image; and
   in response to receiving a signal selecting at least one of valid candidate images, changing a part of the representative image to the selected valid candidate image.

2. The method of claim 1, wherein the displaying is performed when a selection signal of a subject to be changed from the representative image is input.

3. The method of claim 1, wherein the recognizing of the subject from the at least one photographed image comprises at least one of:
   an automatic recognition step recognizing a subject through a subject recognition function; and
   a manual recognition step recognizing the subject by a user.

4. The method of claim 1, wherein the determining of the validity of the extracted candidate image comprises:
   comparing the at least one evaluation reference with a Histogram of the extracted candidate image and determining the extracted candidate image as the invalid candidate image when a difference of the Histogram is greater than a reference value;
   comparing the at least on evaluation reference with a size and a position of the extracted candidate image and determining the extracted candidate image as the invalid candidate image when a difference of at least one of the size and the position is greater than a reference value;
   analyzing the extracted candidate image through a blur detector and determining the extracted candidate image as the invalid candidate image when a difference of analysis result is greater than a reference value; and
   calculating a feature vector of the extracted candidate image and determining the extracted candidate image as the invalid candidate image when a difference of the calculated feature vector is greater than a reference value.

5. The method of claim 4, wherein the determining of the validity of the extracted candidate image further comprises normalizing the extracted candidate image.

6. The method of claim 1, wherein the displaying of the valid candidate image and the invalid candidate image comprises at least one of:
   displaying the valid candidate image as an activated state, and displaying the invalid candidate image as an inactivated state;
   displaying differently at least one of a color and a contrast of the valid candidate image and the invalid candidate image; and
   displaying an icon indicating the valid candidate image or the invalid candidate image on one side of each candidate image.

7. An apparatus for image photographing in a portable terminal, the apparatus comprising:
- a camera unit configured to photograph at least one image a number of times with an interval;
- a controller configured to:
  - recognize a subject from the at least one photographed image,
  - extract a part of the at least one photographed image as a candidate image which includes the recognized subject, and
  - determine a validity of the extracted candidate image based on at least one evaluation reference; and
- a touch screen configured to:
  - display a representative image as an entire screen, and
  - display at least one of a valid candidate image which is determined as a valid candidate image and an invalid candidate image which is determined as an invalid candidate image on one side of a display screen of the representative image,
- wherein the processor further configured to change, in response to receiving a signal selecting at least one of valid candidate images, a part of the representative image to the selected valid candidate image.

8. The apparatus of claim 7, wherein the controller is configured to display a candidate image corresponding to a subject selected according to an input signal on one side of a screen when a signal selecting a subject to be changed from the representative image is input.

9. The apparatus of claim 7, wherein the controller is configured to recognize a subject through at least one of an automatic recognition recognizing a subject through a subject recognition function, and a manual recognition recognizing the subject by a user.

10. The apparatus of claim 7, wherein the controller is configured to:
- compare the at least one evaluation reference with a Histogram of the extracted candidate image, and
- determine the extracted candidate image as the invalid candidate image when a difference of the Histogram is greater than a reference value.

11. The apparatus of claim 7, wherein the controller is configured to:
- compare the at least one evaluation reference with a size and a position of the extracted candidate image, and
- determine the extracted candidate image as the invalid candidate image when a difference of at least one of the size and the position is greater than a reference value.

12. The apparatus of claim 7, wherein the controller is configured to:
- analyze the extracted candidate image through a blur detector, and
- determine the extracted candidate image as the invalid candidate image when a difference of analysis result is greater than a reference value.

13. The apparatus of claim 7, wherein the controller is configured to:
- calculate a feature vector of the extracted candidate image, and
- determine the extracted candidate image as the invalid candidate image when a difference of the calculated feature vector is greater than a reference value.

14. The apparatus of claim 7, wherein the controller is configured to:
- display the valid candidate image as an activated state selectable by a user, and
- display the invalid candidate image as an inactivated state which is not selectable by a user.

15. The apparatus of claim 7, wherein the controller is configured to differently display at least one of a color and a contrast of the valid candidate image and the invalid candidate image.

16. The apparatus of claim 7, wherein the controller is configured to display an icon indicating the valid candidate image or the invalid candidate image on one side of each candidate image.

17. The apparatus of claim 7, wherein the controller is configured to display a recommendation icon on one side of an optimum valid image among valid candidate images.

* * * * *